Figure 1:
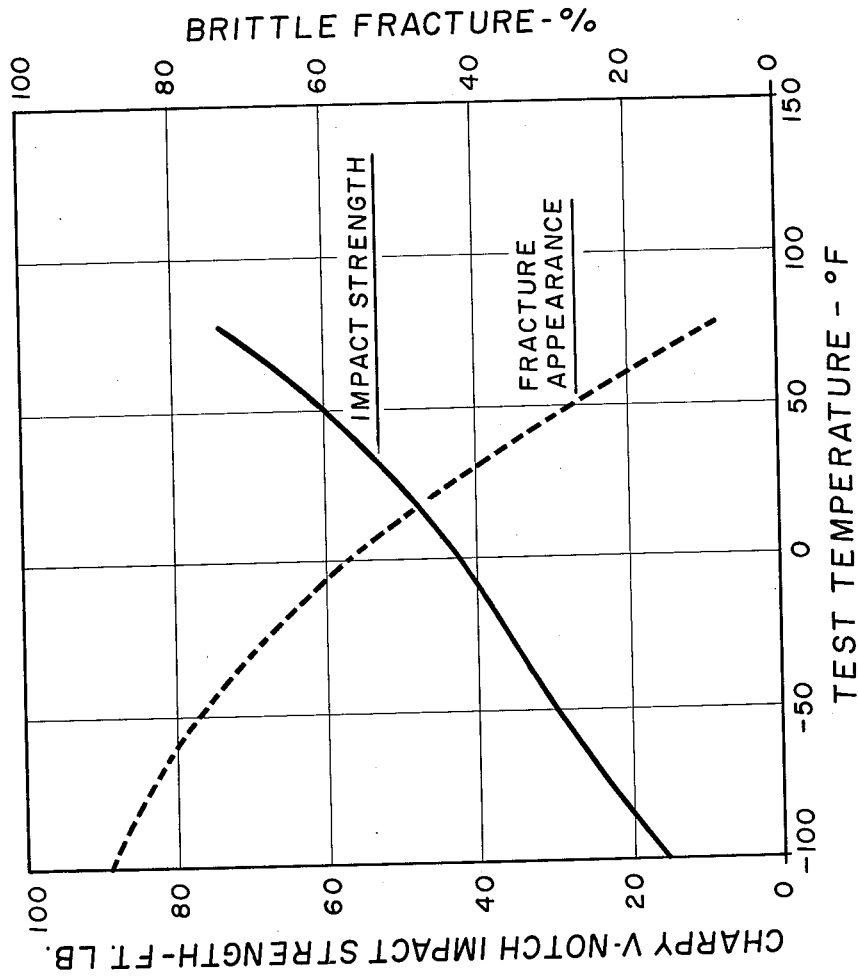
Figure 2:
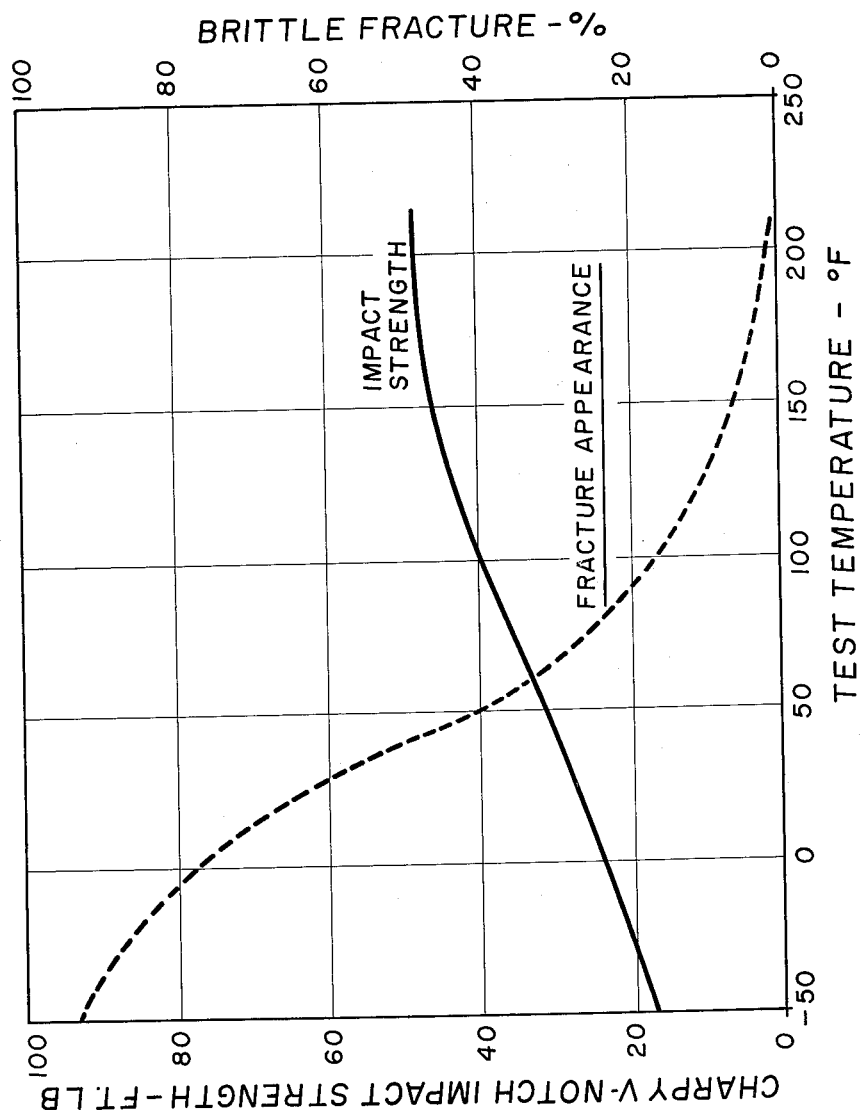
Figure 3:
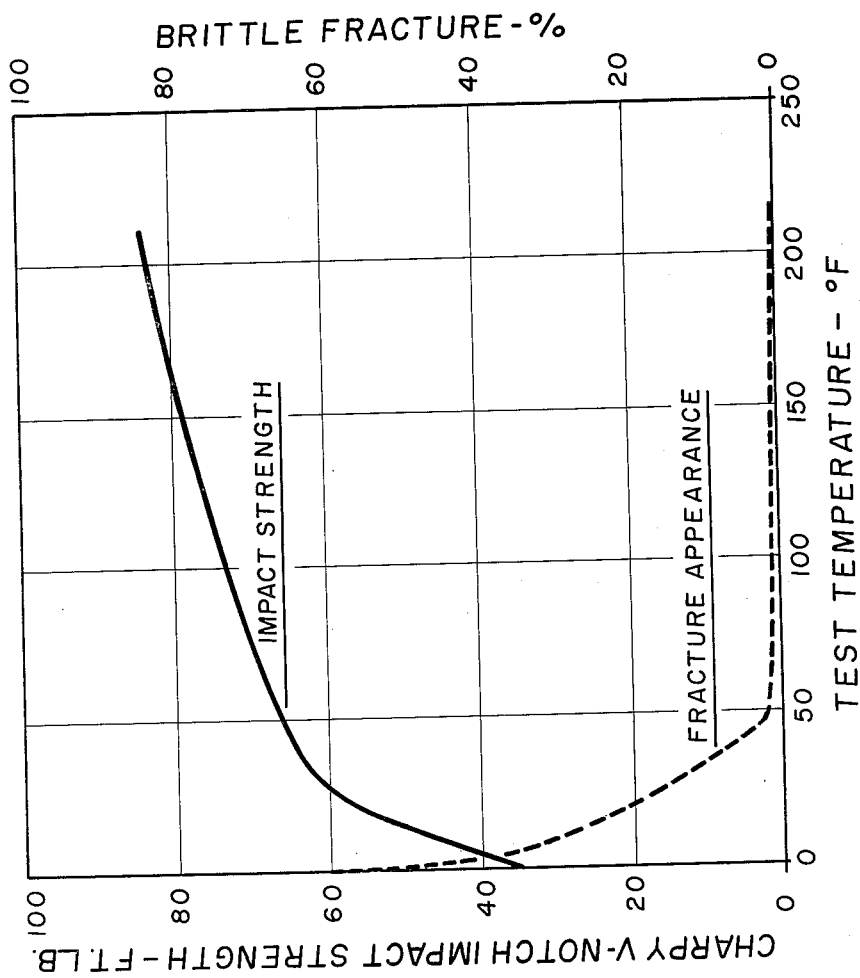
Figure 4:
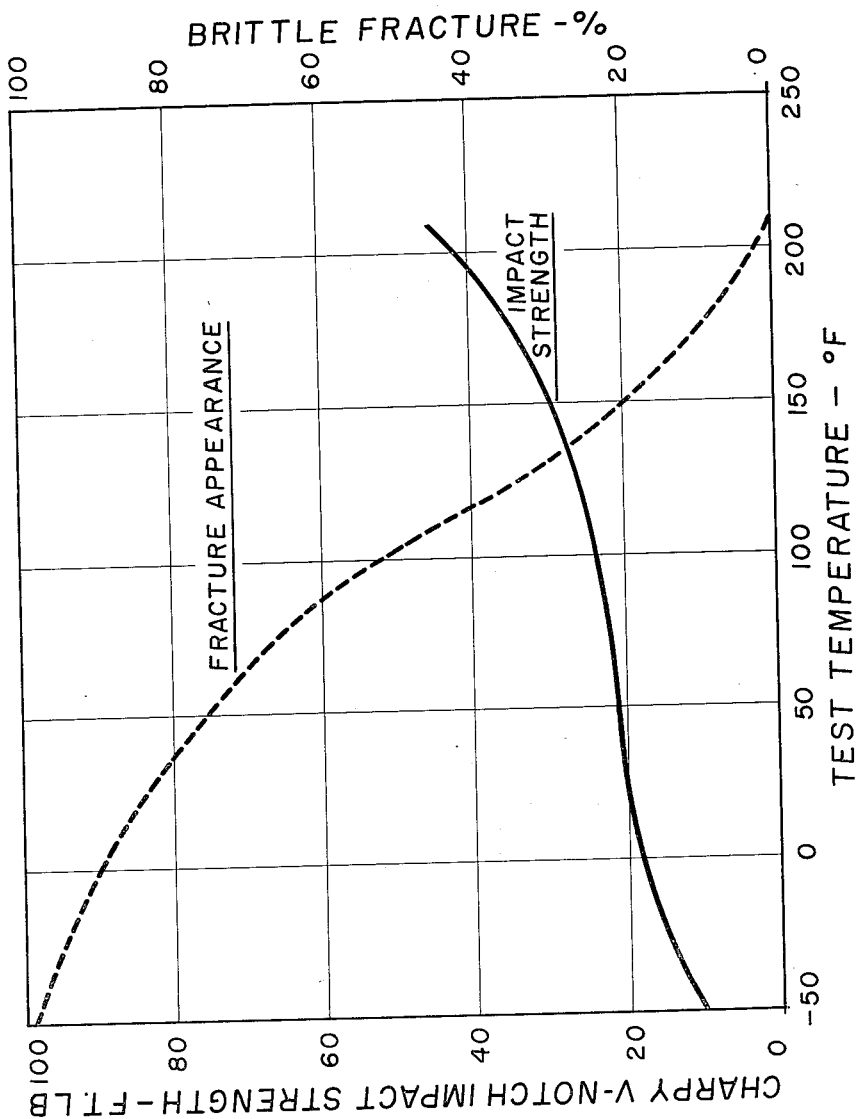

July 11, 1961   R. B. G. YEO ET AL   2,992,148
ALLOY STEELS
Filed April 23, 1959   7 Sheets-Sheet 1

RALPH B. G. YEO
HERSCHEL V. BEASLEY
INVENTORS

BY
ATTORNEY

RALPH B.G. YEO
HERSCHEL V. BEASLEY
INVENTOR.

RALPH B.G. YEO
HERSCHEL V. BEASLEY
INVENTORS

United States Patent Office 2,992,148
Patented July 11, 1961

2,992,148
ALLOY STEELS

Ralph B. G. Yeo, Westfield, and Herschel V. Beasley, Short Hills, N.J., assignors to The International Nickel Company, Inc., New York, N.Y., a corporation of Delaware
Filed Apr. 23, 1959, Ser. No. 808,382
14 Claims. (Cl. 148—36)

The present invention relates to alloy steels and, more particularly, to alloy steels characterized by a unique combination of desired metallurgical properties which enable such steels to be used for special as well as for general purpose applications.

As is known to those skilled in the art, many industrial and commercial applications require alloy steels capable of affording specified combinations of required physical and/or mechanical properties. For example, alloy steels used in the manufacture of generator rotor shafts, particularly those of large size, should, of necessity, be characterized by, inter alia, good magnetic properties, good impact properties, i.e., low impact (brittle-ductile) transition temperatures, high yield strengths, e.g., above 65,000 or 70,000 p.s.i., at 0.02% offset, and high tensile strengths, e.g., over 100,000 p.s.i. However, one or more of the foregoing enumerated properties has been found wanting in presently-used commercial alloy steels for rotor shafts and, as a result, new and improved alloy steels are needed.

In Table I below there is listed a set of standards used by industry in rating generator rotor shaft alloy steels with regard to their magnetic properties.

TABLE I

| Ampere-Turns per Inch to Induce a Flux Density of 130 Kilolines per Sq. In. | Rating |
|---|---|
| Less than 750 | Very Good. |
| 751–1,000 | Good. |
| 1,001–1,250 | Fair. |
| 1,251–1,500 | Poor (Acceptable). |
| Over 1,500 | Reject. |

It has been indicated that the average number of ampere-turns per inch required by large size rotor shafts in present commercial use to induce a flux density of 130 kilolines per square inch is about 1,100. It has been further indicated that if the number of ampere-turns could be reduced to about 800 or below without deleteriously affecting other required properties, substantial economies with respect to cooling equipment per rotor shaft could be realized aside from the significant cost reduction factor achieved through a decrease of required wire.

However, good magnetic properties are but one important consideration. Alloy steels of high magnetic properties but poor impact transition temperatures or inferior strength are not satisfactory. For example, it is known that many alloy steels are susceptible to brittle failure and that brittle failure is related to temperature, particularly to temperature decrease in the case of ferritic steels. As temperature decreases, a temperature range is reached, often referred to in the art as the "transition zone," wherein the alloy steel is passing from a state of toughness into a state of brittleness. As temperature is further decreased, a brittle alloy steel is the inevitable result. Accordingly, apart from other considerations, alloy steels characterized by a low impact transition temperature are the most suitable and desirable in resisting brittle failure. In recent years, rotor shafts have unexpectedly, in view of prior history, suffered catastrophic failure, i.e., the rotor shafts simply burst. Causes of such failure have been attributed to, among other things, the inability of the steel material to prevent propagation of cracks caused by small defects which were and are considered within tolerable and acceptable limits. Authors of reports concerning such failures confirm that the material should possess a fracture appearance transition temperature (FATT) which is not only below the normal operating temperature of the rotor but preferably below the lowest temperature encountered in service. Suffice to say, it is important that steel generator rotor shafts possess good impact properties.

As indicated hereinbefore, alloy steels of good magnetic properties and low impact transition temperatures would not be satisfactory unless they possess sufficient yield and tensile strengths. Thus, if an alloy steel would not be capable of sustaining loads to which it was subjected in service because of, say, poor yield strength, it would be useless for the intended purpose.

The difficulties of producing, for example, satisfactory rotor shafts of large size, i.e., diameters over 30 or 40 inches, e.g., 60 inches or above, from alloy steels are compounded and become more acute when the matter of heat treatment is considered. The size of generator rotors is continually increasing because of commercial and industrial demand. This factor requires that cooling after austenitizing be conducted at slower rates. Liquid cooling would be impractical and ineffective because, inter alia, the rapid cooling rates characteristic of liquid quenching are not maintained in the interior of forgings. Further, there would be undesirable residual stresses induced in the steel as a result of the liquid quench. Alloy steels, as is known, are sensitive to heat treatment. In the production of rotor shafts, it would be advantageous to employ alloy steels which on cooling in air would not form pro-eutectoid ferrite or ferrite or pearlite structural transformations even though section size be substantially varied. Pro-eutectoid ferrite is characteristically a weak structure, and ferrite, though ductile, is soft and lowers yield strength. Pearlite is brittle and not conducive to superior impact properties. An alloy steel of a specific composition, while it would avoid, say, pearlite transformation at a particular section diameter, might fail if the section size were doubled and the same heat treatment was applied as applied to the section of smaller size. Thus, an undesirable structural formation could form in the larger size section with destructive consequences. Satisfactory rotor steels should be characterized on cooling by a substantially bainitic structure uniform throughout radial and longitudinal sections of varying size and this structure should be maintained over a relatively wide range of cooling rates. It would be most advantageous if an alloy steel could be provided which would manifest a relative insensitivity to heat treatment regardless of section size, i.e., an alloy of steel devoid of detrimental structural formations over a wide range of cooling rates and section size, but still manifest a desired combination of metallurgical properties including those referred to hereinbefore.

Although attempts were made to overcome the foregoing difficulties and other difficulties, none, as far as we are aware, was entirely successful when carried into practice commercially on an industrial scale.

It has now been discovered that alloy steels of special composition can be provided which manifest, among other properties, good magnetic properties, low impact transition temperatures and satisfactory yield and tensile strengths, thus making such alloy steels eminently suitable for use in divers applications including rotor shaft applications and the like. Moreover, the alloy steels of the invention do not require liquid quenching treatments and can be slowly cooled over a tremendously wide temperature range without the occurrence of detrimental structural transformations although section size be substantially varied.

It is an object of the present invention to provide an alloy steel characterized by a desired combination of metallurgical properties for use in diversified applications.

Another object of the invention is to provide an alloy steel suitable for use in applications requiring steels possessing good magnetic properties, low impact transition temperatures and high yield and tensile strengths.

The invention also contemplates providing rotor shafts comprised of an alloy steel of special composition which is eminently capable of affording a combination of desired properties including good magnetic properties, low impact transition temperatures and high yield and tensile strengths.

Figure 5:
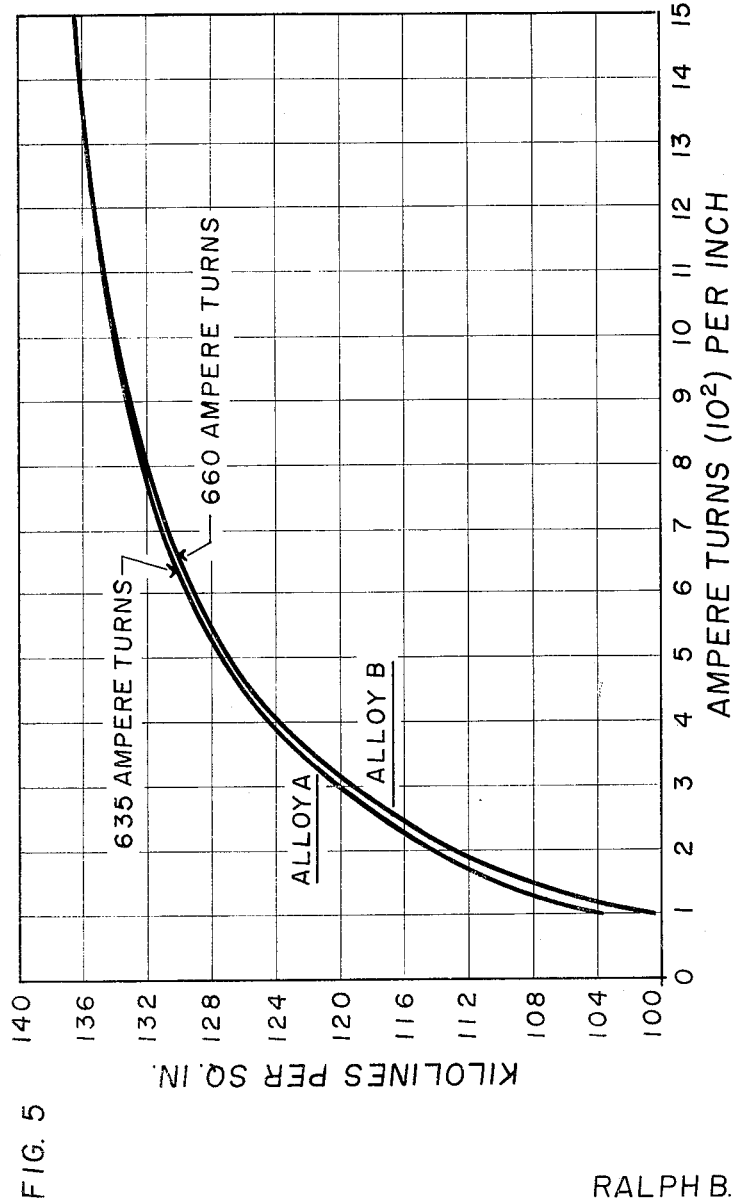
Figure 6:
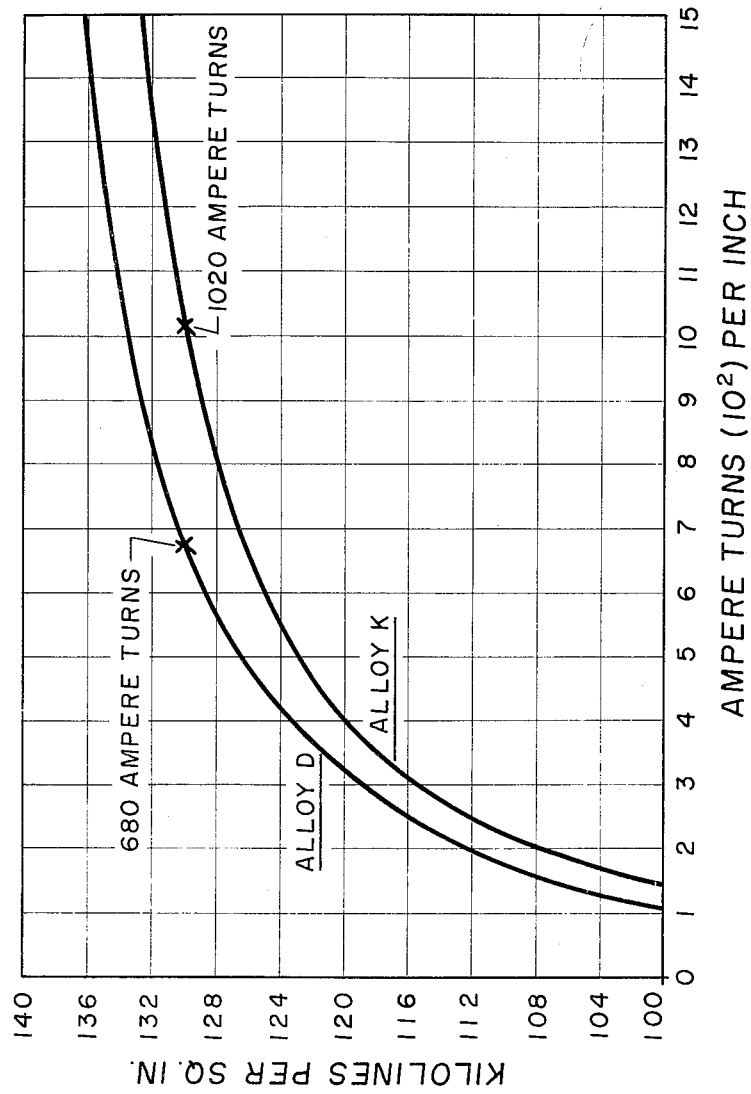
Figure 7:
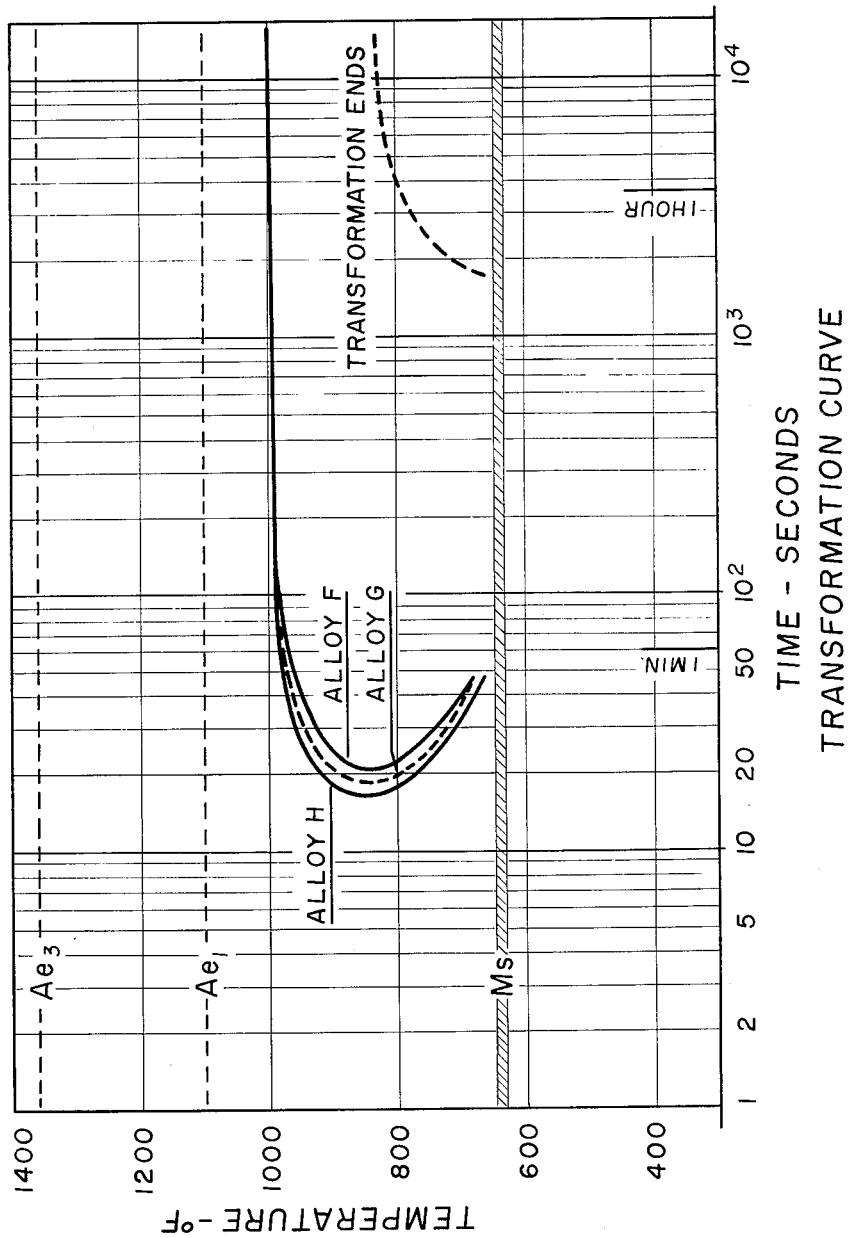

Other objects and advantages will become apparent from the following description taken in conjunction with the drawing in which:

FIGURES 1 to 4 contain curves relating temperature to impact properties of alloy steels of the invention;

FIGURES 5 and 6 depict curves showing the number of ampere turns per inch required to produce certain flux densities in kilolines per square inch with respect to various alloy steels of the invention; and FIGURE 7 depicts transformation-temperature-time curves of alloy steels of the invention.

Generally speaking, the present invention contemplates providing alloy steels of special composition characterized by a good combination of properties including, inter alia, highly satisfactory magnetic properties, low impact transition temperatures and good yield and tensile strengths, thus making the alloy steels suitable for use in diverse applications, e.g., rotor shaft applications. In accordance with the invention, a highly advantageous combination of properties and excellent results are achieved with alloy steels of the following preferred composition: about 0.15% to about 0.3% carbon, e.g., about 0.18% to 0.25%, about 0.2% to about 0.6% manganese, up to about 0.4% silicon, e.g., 0.1% or 0.15% to about 0.4%, from 5% to about 5.5% nickel, about 0.2% to not more than about 0.5% molybdenum, e.g., 0.2% to 0.3% or 0.4% molybdenum, vanadium from a small but effective amount, e.g., 0.04%, up to about 0.25%, up to 0.5% chromium, e.g., 0.2%, the balance being essentially iron. It is further preferred in achieving optimum results that the combined molybdenum and chromium content not exceed 0.75% and when above 0.5% at least 0.1% vanadium be present.

Alloy steels within the foregoing ranges are capable of affording in the normalized-tempered condition yield strengths at 0.02% offset in excess of 65,000 p.s.i., e.g., 85,000 p.s.i. and above, tensile strengths above 100,000 p.s.i., e.g., 120,000 p.s.i. and above, and impact transition temperatures of at least as low as 75° F. and lower, e.g., as low as 12° F. Impact transition temperatures below room temperature and of the order of 12° F. are particularly beneficial. If small cracks (within tolerable limits) are present or formed during service, self propagation of the cracks is avoided when the impact transition temperature is below the temperatures encountered in service. As referred to hereinbefore, self propagation of cracks has been an undesirable characteristic of alloy steels heretofore.

Moreover, alloy steels of the invention require as few as 635 ampere turns per inch, e.g., 680 to 850 ampere turns per inch, to induce a flux density of 130 kilolines per square inch. Thus, in comparison with prior art rotor steels superior magnetic properties are obtained with fewer turns of wire and a substantially lesser amount of heat is generated whereby a significant reduction in cost anent cooling equipment is achieved.

In the normalized-tempered condition the alloy steels of the invention are uniquely characterized by a microstructure comprised of a randomly distributed ferrite carbide aggregate formed only from tempered bainite and tempered martensite. Upon normalizing, the microstructure consists mainly or wholly of bainite depending, as a practical matter, on cooling rate. When the steels of the invention are slowly cooled, a microstructure consisting of practically all bainite is formed. If cooling rates on the order of about 100° F. per hour are employed, the microstructure may contain a small amount of martensite, e.g., about 5%. Upon tempering, the microstructure will comprise only tempered bainite or tempered bainite plus a small amount of tempered martensite resulting from the martensite initially present. This microstructure is maintained though section size be substantially varied and, as will be explained more fully hereinafter, the alloy steels on cooling will not form transformation products, e.g., pro-eutectoid ferrite or pearlite, which would adversely affect the properties of the steels. Thus, problems associated with such transformation products are avoided.

A satisfactory combination of properties is also obtained with alloy steels containing about 0.1% to about 0.5% carbon, about 0.2% to about 1% manganese, up to about 1% silicon, e.g., about 0.05% to about 1% silicon, about 3.75% to about 8% nickel, about 0.07% to about 1% molybdenum, vanadium in a small but effective amount, e.g., 0.02%, up to about 0.5%, the balance being essentially iron.

It is important that the nickel content of the alloy steels not exceed about 8%. Nickel contributes greatly to the strength and toughness of the alloy steels, but amounts appreciably exceeding about 8%, e.g., 9%, adversely affect and impair the magnetic properties. Not less than 3.75% nickel should be present to achieve good strength and good impact properties. Nickel in amounts up to about 7% serves to markedly enhance the impact transition temperatures of the alloy steels of the invention and such amounts can be advantageously employed with the preferred alloy compositions of the invention.

Sufficient molybdenum must be present in combination with the specified amount of the other elements of the alloy steels to insure suitable transformation characteristics so that bainite, and not ferrite or pearlite, is formed when the steels are cooled at, say, about 100° F. per hour. Molybdenum contributes to the strength but amounts appreciably exceeding 0.5% impair magnetic properties and also adversely affect impact transition temperatures. For generator rotor shaft applications, particularly those of large section size, i.e., above 30 inches in diameter, best results are obtained with molybdenum contents of 0.2% to not more than 0.45% or 0.5%, e.g., 0.25% to 0.45%. The higher end of this molybdenum range can be very effectively employed when a substantial amount of vanadium is present, e.g., 0.1% or 0.2% to 0.3% vanadium.

It has been found that vanadium, in addition to increasing strength of the alloys, markedly improves the impact properties (low impact transition temperatures) of the alloy steels of the present invention (alloys D, E and H of Tables II and III). While the mechanism responsible for this marked combined effect might not be fully understood, it is believed that the advantages derived are primarily a result of a nickel-vanadium cooperative action. It is known that when alloy steels are subjected to double austenitizing treatments, the second austenitizing treatment if carried out at too high temperature will cause a deterioration in impact properties. For example, heating at 1650° F. for 16 hours causes such a grain coarsening effect that the resultant grain size is of the order of ASTM No. 0. Nickel in amounts employed in the present invention, e.g., 5% or more, significantly lowers the $Ae_3$ as well as the $Ae_1$ temperature. Thus, high temperature second austenitizing treatments can be avoided with the resultant effect that the vanadium carbides will not dissolve and therefore can exert their maximum influence in preventing grain growth. Thus, greater amounts of molybdenum and/or chromium can be employed to achieve greater strength without detrimentally affecting impact transition temperature.

Chromium should be specially controlled in the alloys of the invention. While chromium improves the strength of the alloys, it can also exert an adverse influence upon the impact transition temperature and impair the magnetic properties of the alloy steels. Where a combination of good strength, good impact properties and high magnetic properties is essential, e.g., rotor shafts, the chromium content should be kept low, i.e., not more than 0.5% and preferably lower, e.g., 0.2%. For applications requiring alloy steels of high strength and where low impact transition temperatures or good magnetic properties would not be required, up to about 1% or even up to 2% chromium can be employed.

Carbon, manganese and silicon should be controlled within the limits above specified. Raising the carbon content while it increases strength impairs toughness and magnetic properties. Manganese also contributes to strength and silicon is primarily present for deoxidation purposes.

In carrying the invention into practice, the alloy steels are amenable to a wide range of initial temperature treatment. The steels after forging are first austenitized which serves as a partial homogenization. This heat treatment can be carried out over a broad range of temperatures, e.g., about 1550° F. to about 1750° F. In practice, economic considerations such as furnace life, oxidation and scaling considerations may dictate maximum initial austenitizing temperature. Under inert conditions or under vacuum, temperatures as high as 2000° F. could be employed. The steels can be held at such temperatures for a period as desired. Alloy steels of the invention have been held at temperatures of about 1625 to 1650° F. for periods of 1 hour and up to 16 hours with good results. The forging operation in itself can be employed as the initial austenitizing treatment. The steels are then cooled until transformation is complete and, as will be described herein, the alloy steels are virtually insensitive to cooling rate. Cooling rates from 216,000° F. per hour down to 4° F. per hour can be employed. (Cooling at a rate of 100° F. per hour approximates that of a 44 inch diameter rotor when cooled in still air from 1300° F. to 1200° F.) Cooling can be continued to temperatures above room temperature, e.g., about 450° F., before re-heating or it can be continued down to room temperature. The alloy steels are then given a second austenitizing treatment and this temperature should be just above and as close as possible to the $Ae_3$ temperature. The second austenitizing treatment should be carried out at a temperature which is not more than about 100° F., e.g., 50° F., above the $Ae_3$ temperature. While the steels must be austenitized completely, high second austenitizing temperatures, as mentioned hereinbefore, are causative of grain growth with resultant deterioration of properties. After again cooling as described above, the steels are then tempered and cooled. The steels should be tempered above 1000° F. for full stress relief, to stabilize the structure and to avoid impairing magnetic properties. A tempering temperature should be used which is close as possible to the $Ae_1$ temperature but without running the risk of forming austenite because of composition variations and inaccurate control of temperature. A suitable maximum tempering treatment would be about 50° F. below the $Ae_1$ temperature.

For the purpose of giving those skilled in the art a better understanding of the invention and/or a better appreciation of the advantages of the invention, the following illustrative example is given:

*Example I*

Several alloy steels having compositions within the preferred ranges and broader ranges of the invention, as shown in Table II hereinafter, were subjected to heat treatment. Various heat treatments were employed and are given as follows:

HEAT TREATMENT I (1) Austenitized at 1625° F. for 1 hour
(2) Air-cooled to room temperature at a rate of 100° F. per hour
(3) Austenitized at 1480° F. for 1 hour
(4) Air-cooled to room temperature at a rate of 100° F. per hour
(5) Tempered at 1100° F. for 24 hours
(6) Cooled at a rate of 50° F. per hour to room temperature

HEAT TREATMENT II (1) Austenitized at 1650° F. for 2 hours
(2) Air-cooled to room temperature at a rate of 100° F. per hour
(3) Austenitized at 1470° F. for 2 hours
(4) Air-cooled to room temperature at a rate of 100° F. per hour
(5) Tempered at 1025° F. for 16 hours
(6) Cooled at a rate of 25° F. to 50° F. per hour to room temperature

HEAT TREATMENT III (1) Austenitized at 1650° F. for 16 hours
(2) Air-cooled to 450° F. at a rate of 100° F. per hour and held for 24 hours
(3) Austenitized at 1450° F. for 16 hours
(4) Air-cooled to 450° F. at a rate of 100° F. per hour and held for 24 hours
(5) Tempered at 1075° F. for 16 hours
(6) Cooled at a rate of 25° F. to 50° F. per hour to room temperature

HEAT TREATMENT IV (1) Austenitized at 1650° F. for 16 hours
(2) Air-cooled to room temperature at a rate of 100° F. per hour
(3) Austenitized at 1450° F. for 16 hours
(4) Air-cooled to room temperature at a rate of 100° F. per hour
(5) Tempered at 1075° F. for 16 hours
(6) Cooled at a rate of 25° F. to 50° F. per hour to room temperature

TABLE II

| Alloy | C, Percent | Si, Percent | Mn, Percent | Ni, Percent | Mo, Percent | Cr, Percent | V, Percent | Heat Treatment |
|---|---|---|---|---|---|---|---|---|
| A | 0.21 | 0.089 | 0.54 | 5.23 | 0.24 | | 0.05 | I |
| B | 0.16 | 0.03 | 0.49 | 5.32 | 0.23 | 0.19 | 0.03 | II |
| C | 0.18 | 0.21 | 0.39 | 5.24 | 0.43 | 0.16 | 0 09 | III |
| D | 0.23 | 0.04 | 0.39 | 5.37 | 0.46 | 0.18 | 0.21 | II |
| E | 0.2 | 0.18 | 0.32 | 5.29 | 0.31 | 0.18 | 0.23 | III |
| F | 0.22 | 0.19 | 0.52 | 5.42 | 0.25 | 0.19 | 0.04 | IV |
| G | 0.23 | 0.28 | 0.52 | 5.35 | 0.27 | 0.2 | 0.08 | IV |
| H | 0.22 | 0.24 | 0.53 | 5.35 | 0.29 | 0.2 | 0.16 | IV |
| I | 0.24 | 0.11 | 0.57 | 5.23 | 0.44 | 0.15 | 0.06 | II |
| J | 0.23 | 0.1 | 0.52 | 5.28 | 0.25 | 0.39 | 0.06 | II |
| K | 0.22 | 0.1 | 0.64 | 5.26 | 0.47 | 0.42 | 0.06 | II |
| L | 0.23 | 0.12 | 0.51 | 5.28 | 0.43 | 0.14 | 0.08 | II |
| M | 0.25 | 0.03 | 0.35 | 5.22 | 0.56 | 0.13 | 0.05 | II |
| N [1] | 0.22 | 0.12 | 0.26 | 5.29 | 0.44 | 0.17 | | III |
| O | 0.2 | 0.17 | 0.34 | 6.02 | 0.43 | 0.14 | 0.08 | III |
| P | 0.19 | 0.09 | 0.3 | 6.98 | 0.41 | 0.17 | 0.1 | III |
| Q | 0.2 | 0.15 | 0.29 | 7.93 | 0.43 | 0.12 | 0.09 | III |

[1] Alloy contained 0.12% columbium in place of vanadium.

The mechanical properties of the alloy steels were determined using standard 0.505 inch diameter tensile specimens and are listed in Table III below and impact transition temperatures are also tabulated.

TABLE III

| Alloy | 0.02% Offset Yield Strength (p.s.i.) | Ultimate Tensile Strength (p.s.i.) | Elongation, Percent | Reduction of Area, Percent | Impact Transition Temp., °F.[2] |
|---|---|---|---|---|---|
| A | 73,500 | 102,750 | 25 | 49 | +12 |
| B | 75,512 | 107,589 | 23 | 60.3 | +12 |
| C | [1] 83,550 | [1] 121,550 | [1] 23 | [1] 60.5 | +40 |
| D | 93,985 | 108,271 | 20.5 | 54.8 | +40 |
| E | [1] 86,900 | [1] 118,600 | [1] 25 | [1] 63 | 0 |
| F | 76,500 | 107,500 | 20 | 54 | +34 |
| G | 72,500 | 127,300 | 19 | 51 | +20 |
| H | 77,250 | 126,000 | 21 | 55 | +18 |
| I | 87,719 | 127,569 | 22 | 57.9 | +100 |
| J | 88,972 | 102,005 | 21 | 56.3 | +82 |
| K | 92,361 | 117,698 | 19.5 | 55.5 | +102 |
| L | 90,225 | 104,812 | 20 | 49 | +92 |
| M | 82,376 | 100,849 | 19 | 50 | +75 |
| N | [1] 81,900 | [1] 114,850 | [1] 23.5 | 58.5 | +24 |
| O | [1] 88,300 | [1] 123,000 | [1] 23 | [1] 59 | +39 |
| P | [1] 93,450 | [1] 133,100 | [1] 22 | [1] 58 | +16 |
| Q | [1] 101,500 | [1] 142,550 | [1] 21 | [1] 58 | +8 |

[1] Average for 2 specimens.
[2] Average for 3 specimens.

For purposes of illustration, the impact strength as well as impact transition curves of alloys A, D, E and K are graphically depicted in FIGS. 1 through 4 respectively. Standard V-notch Charpy testing procedures were employed, ASTM Standard M23–47T Type A. (10 x 10 x 55 mm., 45° notch, i.e., 2 mm. deep, 0.25 mm. radius). For the Fracture Appearance curves of FIGS. 1 to 4, the usual brittle fracture appearance evaluation employed in the art was used, the transition temperature being taken as the temperature at 50% brittle fracture. The visual evaluation was made on the fractured surface of the impact test specimens.

The curves of FIGS. 5 and 6 and the data given in Table IV are illustrative of the magnetic properties of various alloy steels of the invention. Cylindrical specimens 5 inches long by 0.5 inch diameter and direct current magnetization were used in the tests.

TABLE IV

| Alloy | Kilolines per sq. in. at specified ampere turns per in. | | | | | | | |
|---|---|---|---|---|---|---|---|---|
| | 100 | 200 | 300 | 400 | 500 | 1,000 | 1,500 | 2,000 |
| A | 103.4 | 114.4 | 119.7 | 124.4 | 127.4 | 133.8 | 136.5 | 138.6 |
| B | 100.3 | 113.6 | 119.3 | 124.0 | 126.9 | 133.7 | 136.4 | 138.4 |
| D | 97.9 | 112.6 | 118.7 | 123.4 | 126.3 | 133.3 | 136.0 | 138.1 |
| K | 89.2 | 107.9 | 115.3 | 120.0 | 123.0 | 129.8 | 132.7 | 135.2 |

It will be noted from the data of Tables III and IV and FIGS. 1 through 6 of the drawing that alloy steels of the invention manifest a highly satisfactory combination of metallurgical properties including good yield and tensile strengths, low impact transition temperature with good impact strength and good magnetic properties. As pointed out herein, extremely low impact transition temperatures are readily obtained, 0° F. for alloy E and 12° F. for alloys A and B. Such results are greatly superior to impact translation temperatures characteristic of prior art alloy steels used for generator rotor shafts, e.g., 150° F. It should be noted that alloys I through M show impact transition temperatures above room temperature. In each of these alloys the combined molybdenum and chromium contents was rather high and the vanadium content was relatively low. Alloy J contained a combined molybdenum and chromium content of 0.64% with 0.06% vanadium and had an impact transition temperature of 80° F. which is reasonably good. On the other hand, alloy D containing the same combined molybdenum and chromium content as alloy J but containing 0.21% vanadium had an impact transition temperature of 40° F. Similar comparisons may be made between alloys K and C and between alloys D and L. As stated herein, for optimum results, when the combined molybdenum and chromium content exceeds 0.5% at least 0.1% vanadium should be present and the combined molybdenum and chromium contents should not exceed 0.75%. Impact transition temperatures are also lowered as the amount of nickel is increased as can be seen from alloys O, P and Q. Alloy N which contained 0.12% columbium manifested a good combination of properties. Columbium can be used to replace vanadium in whole or in part, but it is preferred to use vanadium.

As can be seen from the curves in FIGS. 5 and 6 and the data in Table IV, the magnetic properties are highly satisfactory. Alloys A, B and D required but 635, 660 and 680 ampere turns per inch, respectively, to induce a flux density of 130 kilolines per square inch. Alloy K which required 1020 ampere turns per inch to induce the same flux density, an acceptable value, contained the highest combined amount of molybdenum plus chromium, i.e., 0.89%. As previously stated, increasing the molybdenum and chromium contents results in lowering magnetic properties.

In addition to the highly satisfactory combination of properties manifested by the alloy steels of the invention, it has been found that the steels of preferred composition are, practically speaking, insensitive to cooling rate effects and changes in section size, a rather unique characteristic and most advantageous feature of the invention. Recourse to steels of various compositions (even if available) which would be required for proper response to heat treatment because of, for example, a change in section size, is eliminated. This marked advantage is evident from a perusal of the transformation-temperature-time curve (TTT curve) of alloys F, G and H in FIG. 7. The TTT curve is unusual since there is a complete absence of pro-eutectoid ferrite or pearlite curves and there is a relatively long bainite shelf and a short bainite incubation period. (The noses of the curves indicate beginning of bainite transformation.) Alloys F, G and H were isothermally held at 1100° F. for 2 weeks and there was no occurrence of a transformation product. Thus, as a practical matter it is virtually impossible on cooling to produce deleterious transformation products such as pearlite. In the production of rotor shafts, it is important, as referred to hereinbefore, to avoid, for example, pearlite formation since pearlite is brittle and, if formed to any substantial degree, could lend to catastrophic effects. In endeavoring to produce rotor shafts of substantial size, e.g., 60 inches in diameter, extreme slow cooling is obviously necessary. Such cooling rates ordinarily would intersect the pearlitic curves of prior art alloy steels. In accordance with the invention, the alloy steels of preferred composition can be satisfactorily cooled at a rate as high as 216,000° F. per hour to a rate as low as 4° F. per hour without formation of deleterious transformation products.

The virtual insensitivity of the alloy steels of the invention of preferred composition to cooling rates and changes in section size was surprising and the exact theory which would explain this unpredictable behavior is not clearly understood, particularly in view of what is known in the prior art. It is known that such elements as carbon, molybdenum, and chromium retard the beginning of structural transformation (push the transformation curves, e.g., pearlite, to the right). Further, it is known that nickel lowers the $Ae_1$ temperature. However, insofar as we are aware, the literature on alloy steels would not seem to account for the TTT curves of FIG. 7, including the long bainite shelf. For example, the TTT curves for AISI steels 2512 and 2515 which contain over 5% nickel show that it would be practically impossible to avoid ferrite formation at slow cooling rates. Thus, the fact that the alloy steels of the invention will transform to a bainitic microstructure on cooling over a wide range of cooling rates renders the steels eminently suitable for use in large forgings or castings of various section sizes.

The alloy steels of the present invention are suitable for use in a wide variety of applications. Large forgings, castings, plates, carburized parts, etc., are illustrative of some of the applications in which the steels can be employed. The highly satisfactory combination of metallurgical properties of the steels, including high yield and tensile strengths, low impact transition temperatures and good magnetic properties render the steels particularly suitable for use in the production of generator rotor shafts. Rotor shafts which do not require magnetic properties including gas and steam turbine and compressor rotor shafts and which are capable of withstanding temperatures of up to 950° F. in service can be produced from alloy steels of the invention. Moreover, the alloy steels can be employed with satisfactory results in applications requiring liquid quenched steels or where liquid quenching treatments would be suitable.

As will be readily understood by those skilled in the art, the term "balance" when used to indicate the amount of iron in the alloy steels does not exclude the presence of other elements commonly present as incidental elements, e.g., deoxidizing and cleaning elements, and impurities ordinarily associated therewith in small amounts which do not adversely affect the basic characteristics of the steels. For example, up to 0.1% aluminum can be present for deoxidizing purposes.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. An alloy steel in the normalized-tempered condition and characterized by a microstructure comprised of a randomly distributed ferrite carbide aggregate formed only from tempered bainite and tempered martensite wherein the tempered bainite was present in an amount of at least 95%, said alloy steel containing about 0.15% to about 0.3% carbon, about 0.2% to about 0.6% manganese, up to about 0.4% silicon, from 5% to about 5.5% nickel, about 0.2% to about 0.5% molybdenum, vanadium in an amount up to about 0.25%, up to about 0.5% chromium, the balance being essentially iron, said alloy steel being further characterized by a good combination of properties including good yield and tensile strength, a low impact transition temperature and good magnetic properties.

2. An alloy steel as described in claim 1 wherein the chromium content does not exceed 0.2%.

3. An alloy steel in the normalized-tempered condition characterized by a microstructure comprised of a randomly distributed ferrite carbide aggregate formed only from tempered bainite and tempered martensite, said alloy steel containing about 0.18% to about 0.25% carbon, about 0.2% to about 0.6% manganese, 0.1% to about 0.4% silicon, from 5% to about 5.5% nickel, about 0.2% to about 0.5% molybdenum, about 0.04% to about 0.3% vanadium, up to about 0.5% chromium, the sum of molybdenum plus chromium being not more than 0.75% and when greater than 0.5% the vanadium being at least 0.1%, the balance being essentially iron, said alloy steel being further characterized by a good combination of properties including good yield and tensile strength, a low impact transition temperature and good magnetic properties.

4. An alloy steel in the normalized-tempered condition characterized by a microstructure comprised of a randomly distributed ferrite carbide aggregate formed only from tempered bainite and tempered martensite wherein the tempered bainite was present in an amount of at least 95%, said alloy containing about 0.15% to about 0.3% carbon, about 0.2% to about 0.6% manganese, up to about 0.4% silicon, from 5% to about 7% nickel, about 0.2% to about 0.5% molybdenum, vanadium in a small but effective amount up to about 0.25%, up to about 0.5% chromium, the balance being essentially iron, said alloy being further characterized by a good combination of properties including good yield and tensile strength, a low impact transition temperature and good magnetic properties.

5. An alloy steel as described in claim 4 wherein the chromium content does not exceed 0.2%.

6. An alloy steel suitable for use in the manufacture of rotor shafts and possessing good yield and tensile strengths, a low impact transition temperature and good magnetic properties, said alloy steel having in the normalized-tempered condition a microstructure comprised of a randomly distributed ferrite carbide aggregate formed only from tempered bainite and tempered martensite and containing about 0.18% to about 0.25% carbon, about 0.2% to about 0.6% manganese, 0.1% to about 0.4% silicon, from 5% to about 5.5% nickel, about 0.2% to about 0.5 molybdenum, columbium in an amount up to 0.25%, up to less than 0.2% chromium, the balance being essentially iron.

7. An alloy steel characterized when in the normalized-tempered condition by a microstructure comprised of a randomly distributed ferrite carbide aggregate formed only from tempered bainite and tempered martensite, said alloy steel containing about 0.15% to about 0.3% carbon, about 0.2% to about 0.6% manganese, up to 0.4% silicon, from 5% to about 5.5% nickel, about 0.2% to about 0.5% molybdenum, vanadium in an amount up to about 0.25%, up to 0.5% chromium, the balance being essentially iron, said alloy steel being further characterized by the absence upon cooling from austenitizing treatment of pro-eutectoid ferrite or pearlite transformations and the presence of a short bainite incubation period and a relatively wide bainite transformation range.

8. An alloy steel comprised of a randomly distributed ferrite carbide aggregate formed only from tempered bainite and tempered martensite, said alloy steel containing about 0.15% to about 0.3% carbon, about 0.2% to about 0.6% manganese, up to 0.4% silicon, from 5% to about 5.5% nickel, about 0.2% to about 0.5% molybdenum, vanadium in an amount up to about 0.25%, up to 0.5% chromium, the balance being essentially iron, said alloy being further characterized upon cooling from austenitizing treatment by transformation characteristics of the type represented by the curves shown in FIGURE 7 of the accompanying drawings.

9. A generator characterized by a generator rotor shaft produced from an alloy steel having a microstructure comprised of a randomly distributed ferrite carbide aggregate formed only from tempered bainite and tempered martensite, said alloy steel containing about 0.15% to about 0.3% carbon, about 0.2% to about 0.6% manganese, up to about 0.4% silicon, from 5% to about 5.5% nickel, about 0.2% to about 0.5% molybdenum, vanadium in an amount up to about 0.25%, up to about 0.5% chromium, the balance being essentially iron, said alloy steel being further characterized by a good combination of properties including good yield and tensile strength, a low impact transition temperature and good magnetic properties.

10. An alloy steel in the normalized-tempered condition having a microstructure comprised of a randomly distributed ferrite carbide aggregate formed only from tempered bainite and having a composition within the ranges of about 0.15% to about 0.3% carbon, about 0.2% to about 0.6% manganese, up to about 0.4% silicon, from 5% to about 7% nickel, about 0.2% to about 0.5% molybdenum, about 0.02% to about 0.3% vanadium, up to about 0.5% chromium, the sum of molybdenum plus chromium being not more than 0.75% and when greater than 0.5% the vanadium being at least 0.1%, the balance being essentially iron, said alloy steel being characterized by a good combination of properties including good yield and tensile strengths, a low impact transition temperature and good magnetic properties.

11. An alloy steel in the normalized-tempered condition having a microstructure comprised of a randomly distributed ferrite carbide aggregate formed only from tempered bainite and having a composition with the ranges of about 0.18% to about 0.25% carbon, about 0.2% to about 0.6% manganese, up to about 0.4% silicon, from 5% to about 5.5% nickel, about 0.2% to about 0.4% molybdenum, about 0.04% to about 0.25% vanadium, up to about 0.5% chromium, the sum of molybdenum plus chromium being not more than 0.75% and when greater than 0.5% the vanadium being at least 0.1%, the balance being essentially iron, said alloy steel being characterized by a good combination of properties including good yield and tensile strengths, a low impact transition temperature and good magnetic properties.

12. As a new article of manufacture, a generator rotor shaft possessing a good combination of properties including satisfactory yield and tensile strengths, a low impact transition temperature and good magnetic properties and formed from an alloy steel in the normalized-tempered condition having a microstructure comprised of a randomly distributed ferrite carbide aggregate formed only from tempered bainite and up to not more than 5% tempered martensite and having a composition within the ranges of about 0.18% to about 0.25% carbon, about 0.2% to about 0.6% manganese, up to about 0.4% silicon, from 5% to about 5.5% nickel, about 0.2% to about 0.4% molybdenum, about 0.04% to about 0.25% vanadium, up to about 0.5% chromium, the sum of molybdenum plus chromium being not more than 0.75% and when greater than 0.5% the vanadium being at least 0.1%, the balance being essentially iron.

13. An alloy steel containing about 0.18% to about 0.5% carbon, 0.2% to 1% manganese, up to 1% silicon, from 3.75% to about 8% nickel, about 0.07% to about 1% molybdenum, about 0.02% to about 0.5% vanadium, up to 2% chromium, and the balance essentially iron.

14. As a new article of manufacture, a generator rotor shaft formed from the alloy steel set forth in claim 13.

References Cited in the file of this patent

UNITED STATES PATENTS 2,206,370     Scherer _____ July 2, 1940

UNITED STATES PATENT OFFICE

CERTIFICATE OF CORRECTION

Patent No. 2,992,148                                     July 11, 1961

Ralph B. G. Yeo et al.

It is hereby certified that error appears in the above numbered patent requiring correction and that the said Letters Patent should read as corrected below.

Column 2, line 52, strike out "of", second occurrence; column 7, line 51, for "allow" read -- alloy --; line 59, for "translation" read -- transition --.

Signed and sealed this 27th day of March 1962.

(SEAL)
Attest:

ERNEST W. SWIDER                                  DAVID L. LADD
Attesting Officer                                     Commissioner of Patents